United States Patent [19]

Giantonio et al.

[11] Patent Number: 5,417,466
[45] Date of Patent: May 23, 1995

[54] SUN VISOR SYSTEM

[75] Inventors: William A. Giantonio, Newington, Conn.; John Swiatocha, Longmeadow, Mass.

[73] Assignee: United Technologies Automotive, Inc., Dearborn, Mich.

[21] Appl. No.: 147,730

[22] Filed: Nov. 4, 1993

[51] Int. Cl.6 .............................................. B60J 3/00
[52] U.S. Cl. .................................... 296/97.9; 296/97.6
[58] Field of Search ................... 296/97.1, 97.5, 97.6, 296/97.8, 97.9

[56] References Cited

U.S. PATENT DOCUMENTS

| | | |
|---|---|---|
| 1,898,276 | 2/1933 | Van Dresser . |
| 1,932,475 | 10/1933 | Peteler . |
| 1,941,032 | 12/1933 | Knowles . |
| 2,107,247 | 2/1938 | Johnson . |
| 2,120,892 | 6/1938 | Francis . |
| 2,201,197 | 5/1940 | Minor, Jr. . |
| 2,261,881 | 11/1941 | Horstmann . |
| 2,414,340 | 1/1947 | Spraragen . |
| 2,416,761 | 3/1947 | Lande ................... 296/97.9 |
| 2,492,074 | 12/1949 | Thompson . |
| 2,517,872 | 8/1950 | Hamel . |
| 2,596,873 | 5/1952 | Solmes . |
| 2,628,008 | 2/1953 | Innis . |
| 2,634,161 | 4/1953 | Beets . |
| 2,667,222 | 1/1954 | McCarthy et al. . |
| 2,681,824 | 6/1954 | Knoblock ................ 296/97.9 |
| 2,695,193 | 11/1954 | Hamel . |
| 2,823,950 | 2/1958 | Harris ..................... 296/97.6 |
| 2,829,920 | 4/1958 | Cohen . |
| 2,831,725 | 4/1958 | Chester . |
| 2,869,922 | 1/1959 | Chester . |
| 2,921,813 | 1/1960 | Lowry . |
| 2,932,539 | 4/1960 | Galbraith . |
| 2,948,566 | 8/1960 | Massey . |
| 2,965,415 | 12/1960 | Dryden . |
| 2,978,274 | 4/1961 | Ordman . |
| 2,999,718 | 9/1961 | Handler . |
| 3,016,262 | 1/1962 | Hunt . |
| 3,032,371 | 5/1962 | Berridge et al. . |
| 3,191,986 | 6/1965 | Simon . |
| 3,328,071 | 6/1967 | Johnson . |
| 3,369,837 | 2/1968 | Metier . |
| 3,403,937 | 10/1968 | Quaine . |
| 3,499,679 | 3/1970 | Olander . |
| 3,556,585 | 1/1971 | Binder . |
| 3,617,088 | 11/1971 | Graham . |
| 3,649,068 | 3/1972 | Moynihan . |
| 3,865,428 | 2/1975 | Chester . |
| 4,169,552 | 10/1979 | Lichtenstein et al. . |
| 4,272,118 | 6/1981 | Viertel et al. . |
| 4,323,275 | 4/1982 | Lutz . |
| 4,390,202 | 6/1983 | Flowerday et al. . |
| 4,468,062 | 8/1984 | Marcus et al. . |
| 4,500,131 | 2/1985 | Fleming . |
| 4,521,047 | 6/1985 | Saxman . |
| 4,679,843 | 7/1987 | Spykerman ................ 296/97.9 X |
| 4,681,363 | 7/1987 | Hemmeke et al. . |
| 4,690,450 | 9/1987 | Boerema et al. ................ 296/97.9 |
| 4,760,503 | 7/1988 | VandenBerge et al. . |
| 4,762,359 | 8/1988 | Boerema et al. . |
| 4,763,946 | 8/1988 | Robbins et al. . |
| 4,783,111 | 11/1988 | Hemmeke et al. . |
| 4,828,313 | 5/1989 | Lanser et al. . |
| 4,902,068 | 2/1990 | Dowd et al. . |
| 4,913,483 | 4/1990 | Jasso ........................ 296/97.6 |
| 4,913,484 | 4/1990 | Dowd et al. . |
| 4,921,300 | 5/1990 | Lawasanni et al. . |
| 4,958,878 | 9/1990 | Kempkers .................... 296/97.5 |
| 5,080,420 | 1/1992 | Hemmeke et al. ............. 296/97.1 |
| 5,331,525 | 7/1994 | Lawassani et al. .......... 296/97.9 X |

FOREIGN PATENT DOCUMENTS

| | | |
|---|---|---|
| 36659 | 9/1926 | Denmark . |
| 1340981 | 9/1963 | France . |
| 1396360 | 1/1964 | France . |
| 2497157 | 2/1982 | France . |
| 639882 | 5/1962 | Italy . |
| 58-63517 | 4/1983 | Japan . |

*Primary Examiner*—Joseph Pape
*Attorney, Agent, or Firm*—Harness, Dickey & Pierce

[57] ABSTRACT

A sun visor system for an automotive vehicle is comprised of a primary sun visor, which is rotatably affixed in a position proximate with a windshield, and a secondary sun visor, which is rotatable and pivotable from a stowed position against a vehicle headliner panel to a functional position proximate with an adjacent side window. The primary sun visor is restricted from being pivoted toward the vehicle side window.

25 Claims, 5 Drawing Sheets

SUN VISOR SYSTEM

BACKGROUND OF THE INVENTION

This invention relates generally to sun visors for automotive vehicles and specifically to a driver side and a passenger side sun visor system each having a pair of sun visors therein.

In most traditional automotive vehicles it is common to have a driver side and a passenger side primary sun visor which can be rotated from a stowed position adjacent to the bottom of a decorative headliner trim panel to a functional position proximate with the vehicle windshield. These conventional primary sun visors can also be pivoted from the windshield sun blocking position to a second sun blocking position proximate with the vehicle's side window. Accordingly, annoying sunlight can be blocked from a vehicle occupant's eyes when the automotive vehicle is being driven along a curved road. However, not only is this pivoting movement burdensome, but it can also distract the driver's attention when he moves his head out of the way of the swinging sun visor. This head moving situation is further exacerbated by the typically long length of the primary sun visor in combination with the recent trend of locating a front windshield header of the automotive vehicle rearwardly in order to achieve improved exterior aero-dynamics. Another problem is created in that a vanity mirror, which is commonly attached to a face of the primary sun visor, is concurrently pivoted toward the side window along with each primary sun visor. Therefore, the vehicle occupant can not use the vanity mirror when sunlight is being blocked from entering the side window.

Another traditional sun visor system that has been used, provides for both a primary and an auxiliary sun visor at each front corner of the vehicle. This double sun visor system is beneficial over the aforementioned single primary sun visor in that sunlight can be blocked simultaneously along both the front windshield and the adjacent side window. This is often advantageous when driving along a winding road where the sun light intermittently enters the windshield and then the adjacent side window. Two such primary and auxiliary sun visor systems are disclosed in U.S. Pat. No. 2,965,415 entitled "Multiple Shield Sun Visor For Vehicles", which issued to Dryden on Dec. 20, 1960, and U.S. Pat. No. 2,634,161 entitled "Sun Visor", which issued to Beets on Apr. 7, 1953. These systems comprise a pair of sun visor blades which are both freely pivotable from a windshield position to an adjacent side window position about pivots disposed coaxially on a pivot rod. Dryden also shows each sun visor having independent pivot axes. Additionally, a ball and socket pivot means can be used, as is known within the art. While these freely pivoting dual sun visors can be used in combination with a shortened length auxiliary sun visor to minimize the need for an occupant to duck his head upon swinging such toward the side window, the coaxial double pivoting mechanisms create a thick package when stowed. In other words, when the primary and auxiliary sun visors are stowed against the bottom of the headliner panel, their thickness below the headliner panel often obtrusively protruded into the occupant's head room. These conventional sun visor systems are also disadvantageous in that, over time, the sun visors tend to sag since neither the primary nor auxiliary blades are supported at both ends.

More recently, an increasingly refined primary and auxiliary sun visor system has become commonplace within luxury vehicles in the automotive industry. These systems are disclosed in U.S. Pat. No. 4,921,300 entitled "Vehicle Sun Visor Mounting Arrangement" which issued to Lawassani et al. on May 1, 1990, and U.S. Pat. No. 4,783,111 entitled "Visor" which issued to Hemmeke et al. on Nov. 8, 1988. Within these popular systems, a primary sun visor, often carrying an illuminated vanity mirror, is rotatable from a stowed position parallel with the headliner panel to a functional position proximate with the windshield and is then pivotable toward the side window. Furthermore, an auxiliary sun visor is then rotatable from a stowed position against the headliner panel to a functional position proximate to the windshield. The auxiliary sun visor further has the ability to translate laterally between an outboard bezel and a center support upon both of which it is rotatably affixed. The auxiliary sun visor alternately has an extension panel which extends laterally from the auxiliary sun visor thereby fully blocking the sun near the vehicle's A-pillar. While these latter systems represent significant improvements in the art, the vehicle occupant must still inconveniently move his head out of the way to allow swinging movement of the longer primary sun visor. Concurrently, the vanity mirror is also swung to an unusable position proximate with the side window. Therefore, a sun visor system is desired which allows a primary sun visor and a vanity mirror to remain in a useable forward position while a shortened secondary sun visor can be pivoted toward the side window.

SUMMARY OF THE INVENTION

In accordance with the present invention, a new and useful sun visor system for an automotive vehicle is comprised of a primary sun visor, being rotatably affixed in a position proximate with a windshield, and a secondary sun visor, which is rotatable and pivotable from a stowed position against a vehicle headliner panel in back of the primary visor to a functional position proximate with a adjacent side window. The primary sun visor is restrained from pivoting toward the vehicle side window. The secondary sun visor is rotatably joined to a rod which, in turn, is pivotably coupled to an outboard fastening device. Furthermore, the primary sun visor can be stowed against a lower face of the secondary sun visor when the secondary sun visor is stowed against the headliner panel. The primary sun visor can then be rotated downward toward a functional position proximate with the windshield. In another aspect of the present invention, a vanity mirror is mounted upon the primary sun visor. A further aspect of the present invention provides a secondary sun visor with an extension panel which can be retracted for convenient pivoting between its stowed and functional positions.

Accordingly, the present invention sun visor system is advantageous over the prior art in that the present invention minimizes the stowed protrusion into the occupant's head room. Furthermore, the present invention system provides a means for maintaining the vanity mirror in a useable attitude even when the sun is blocked along the side window. Another advantage is that a shortened secondary sun visor can be swung toward the side window thereby reducing interference with the occupant's head. The sun visor system of the present invention maintains the larger primary sun visor adjacent to the windshield since most of the sun light shading is required at the windshield. The relatively smaller secondary sun visor is operable for shading at the side window which is not used as frequently. Also, the present invention allows the usually heavier primary sun visor to be supported at both ends, thus, reducing undesirable sag over time.

Additional advantages and features of the present invention will become apparent from the following description and appended claims, taken in conjunction with the accompanying drawings.

DETAILED DESCRIPTION OF THE PREFERRED EMBODIMENT

Figure 1:
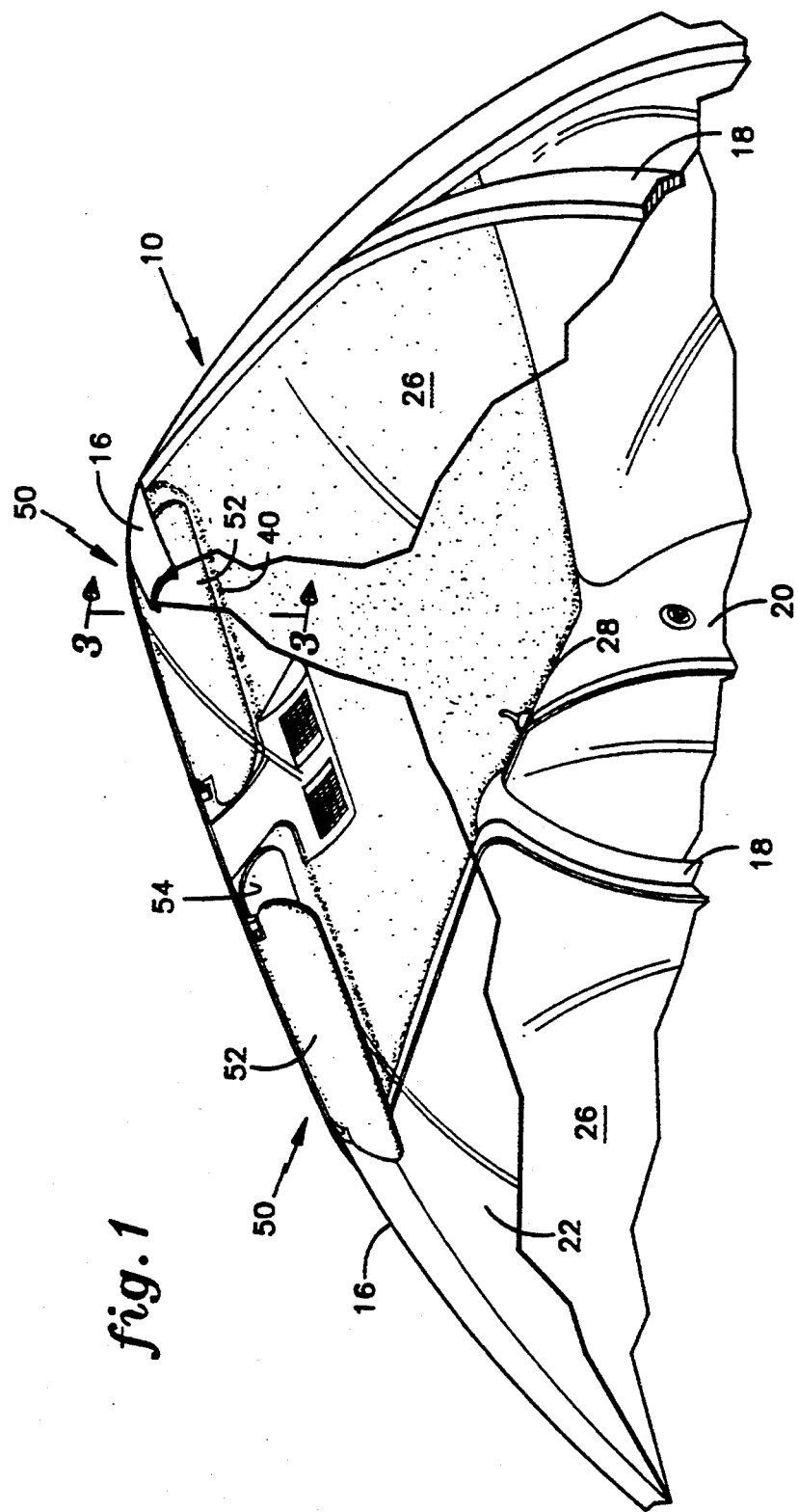
FIG. 1 is a front perspective view of a preferred embodiment of the sun visor system of the present invention shown in relation to an automotive vehicle structural roof and headliner assembly.
Figure 2:
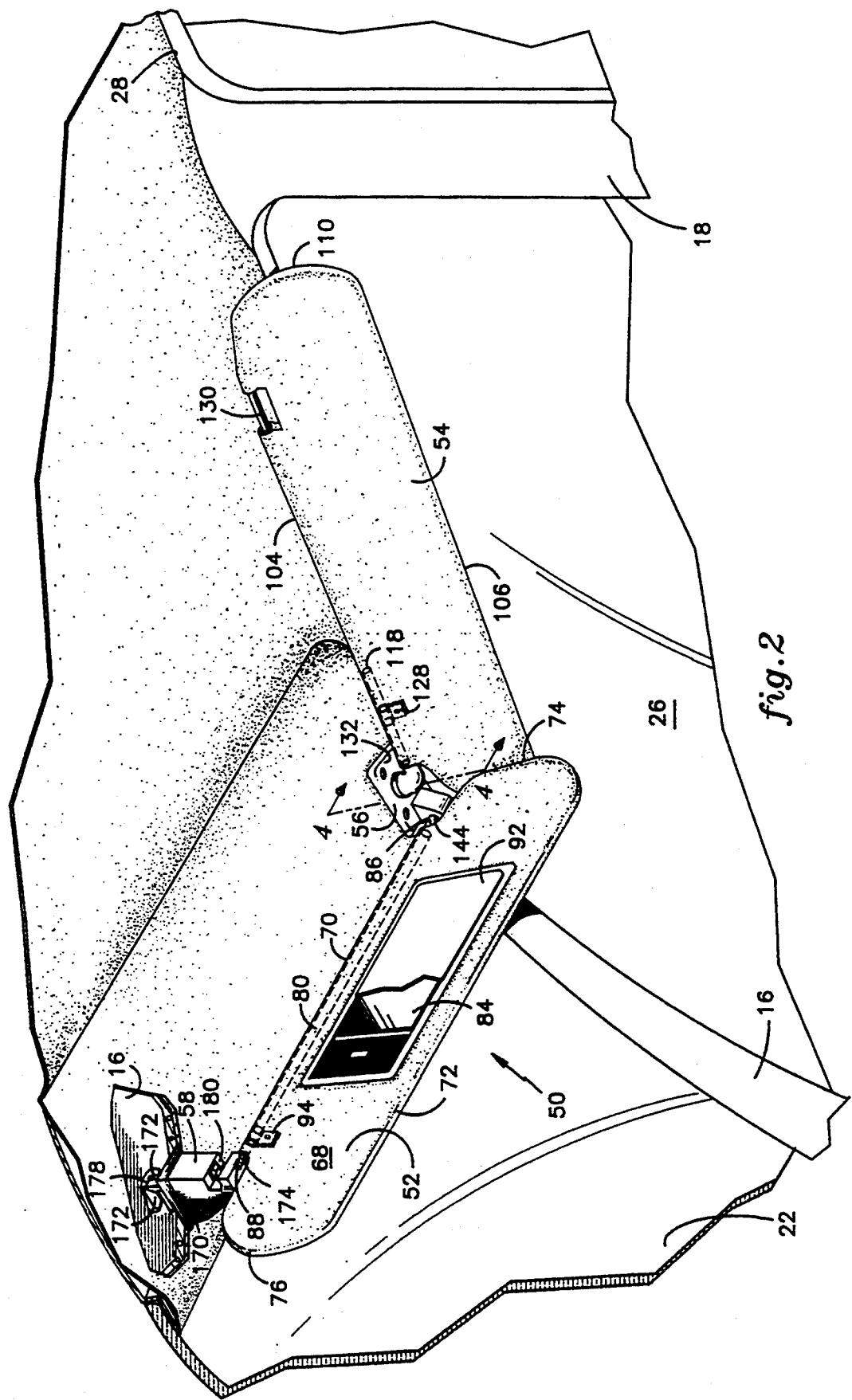
FIG. 2 is a rear perspective view, with portions broken away therefrom, of the sun visor system of the present invention of FIG. 1 showing a primary sun visor and a secondary sun visor in their functional positions.
Figure 3:
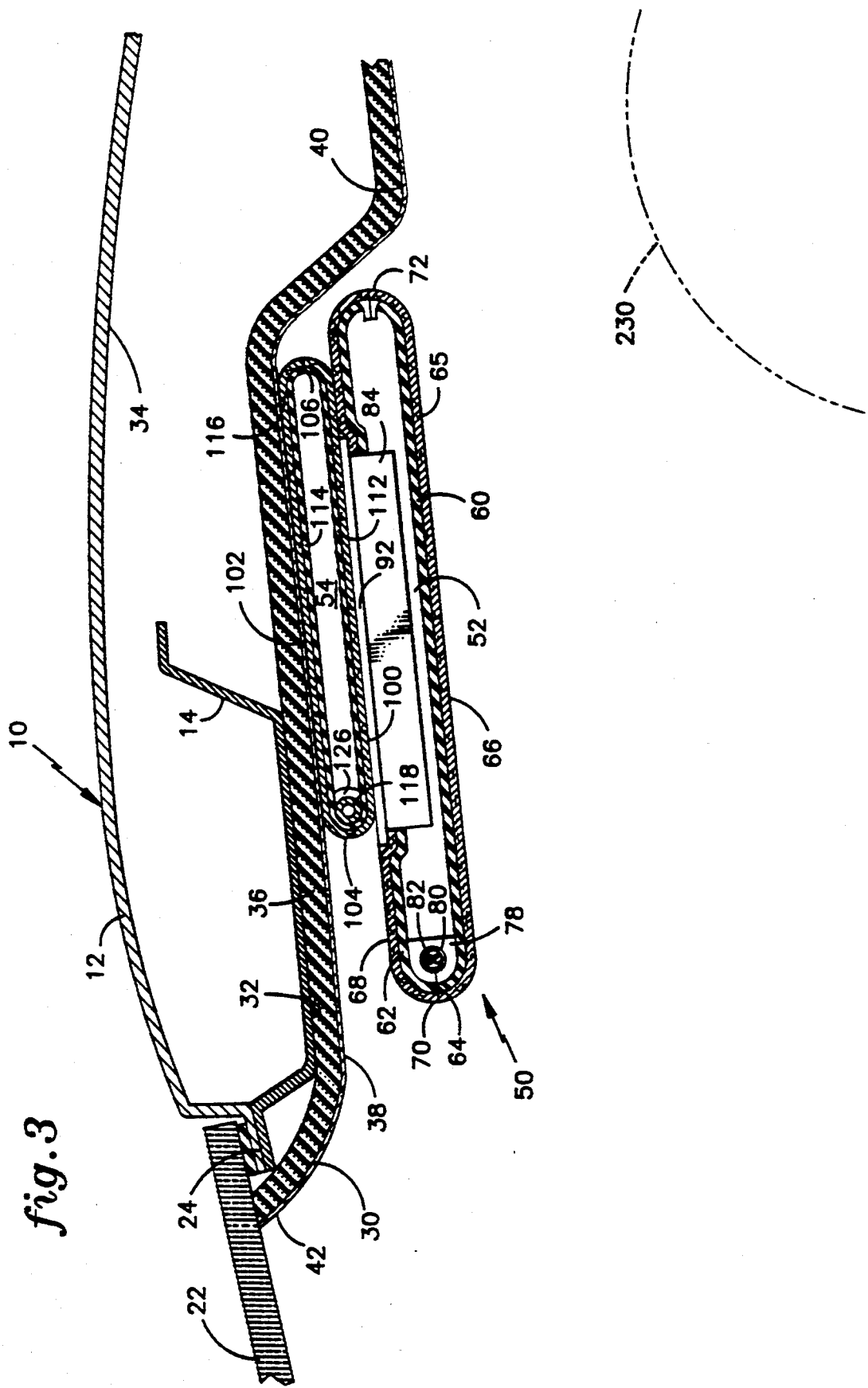
FIG. 3 is a sectional view, taken along line 3—3 of FIG. 1, showing the primary and secondary sun visors in their stowed position.

Referring to FIGS. 1 through 4, a structural roof assembly 10 for a motor vehicle consists of a roof panel 12 (FIG. 3) which is internally supported by a front header 14 (FIG. 3), an A-pillar 16, a B-pillar 18, a C-pillar 20 (FIG. 1) and a variety of rail members. A front windshield 22 is bonded to a flange 24 (FIG. 3) extending around a forward portion of roof panel 12 and A-pillars 16. Furthermore, a side window 26 (FIG. 1) is located within a space defined by A-pillar 16, B-pillar 18 and a side edge 28 (FIG. 1) of roof panel 12. Moreover, a decorative headliner trim panel 30 (FIG. 3) aesthetically covers a lower surface 32 (FIG. 3) of front header 14 and a lower surface 34 (FIG. 3) of roof panel 12 being attached thereto by any suitable means such as fasteners (to be described in greater detail hereinafter) employed with the present invention. Such a headliner panel 30 is constructed from a resinated fiberglass or urethane substrate 36 (FIG. 3) upon the lower surface of which is bonded a cloth or vinyl covering material 38 (FIG. 3). This type of headliner panel 30 is typically compression molded such that various shapes and formations can be molded therein. For example, headliner panel 30 has molded eyebrow formations 40 and a peripheral upturned edge 42 (FIG. 3).

A sun visor system 50 of the present invention is located at each front corner of headliner panel 30 and is comprised of a primary sun visor 52, a secondary sun visor 54, an outboard fastening device 56 and a center support fastener 58. Primary sun visor 52 is preferably made from a pair of injection molded shells 60 and 62 (FIG. 3) which can be joined together by an integral or living hinge 64 (FIG. 3) and a plurality of internal snap-fit attachments (not shown) therebetween. Moreover, primary sun visor 52 has a decorative cloth covering 65. Primary sun visor 52 is further defined by a pair of substantially flat faces 66 and 68 bordered by an upper peripheral edge 70, a lower peripheral edge 72, an outboard end 74 and an inboard end 76. Also, shells 60 and 62 have a plurality of eyelets 78 (FIG. 3) therewithin which provide a rotational bearing formation, extending substantially parallel with upper peripheral edge 70, through which a rotational axle such as a rod 80 extends. This construction is known by one skilled in the art and is generally shown in U.S. Pat. No. 4,763,946 entitled "Visor," which issued to Robbins et al. on Aug. 16, 1988. Alternatively, shells 60 and 62 may be attached to one another by using a hot plate welding method. Rod 80 is preferably a hollow steel tube within which a pair of electrical wires 82 (FIG. 3) are located for supplying electrical current from the automotive vehicle power supply to an optional illuminated vanity mirror unit 84 (FIG. 2). Rod 80 is preferably configured as a single member having an outboard end 86 and an inboard end 88 (FIG. 2). Vanity mirror unit 84 is retained to primary sun visor 52 congruent with face 68. Such a vanity mirror unit 84 may be of an illuminated or non-illuminated variety and may be covered by a lid 92 (FIG. 2).

Figure 4:
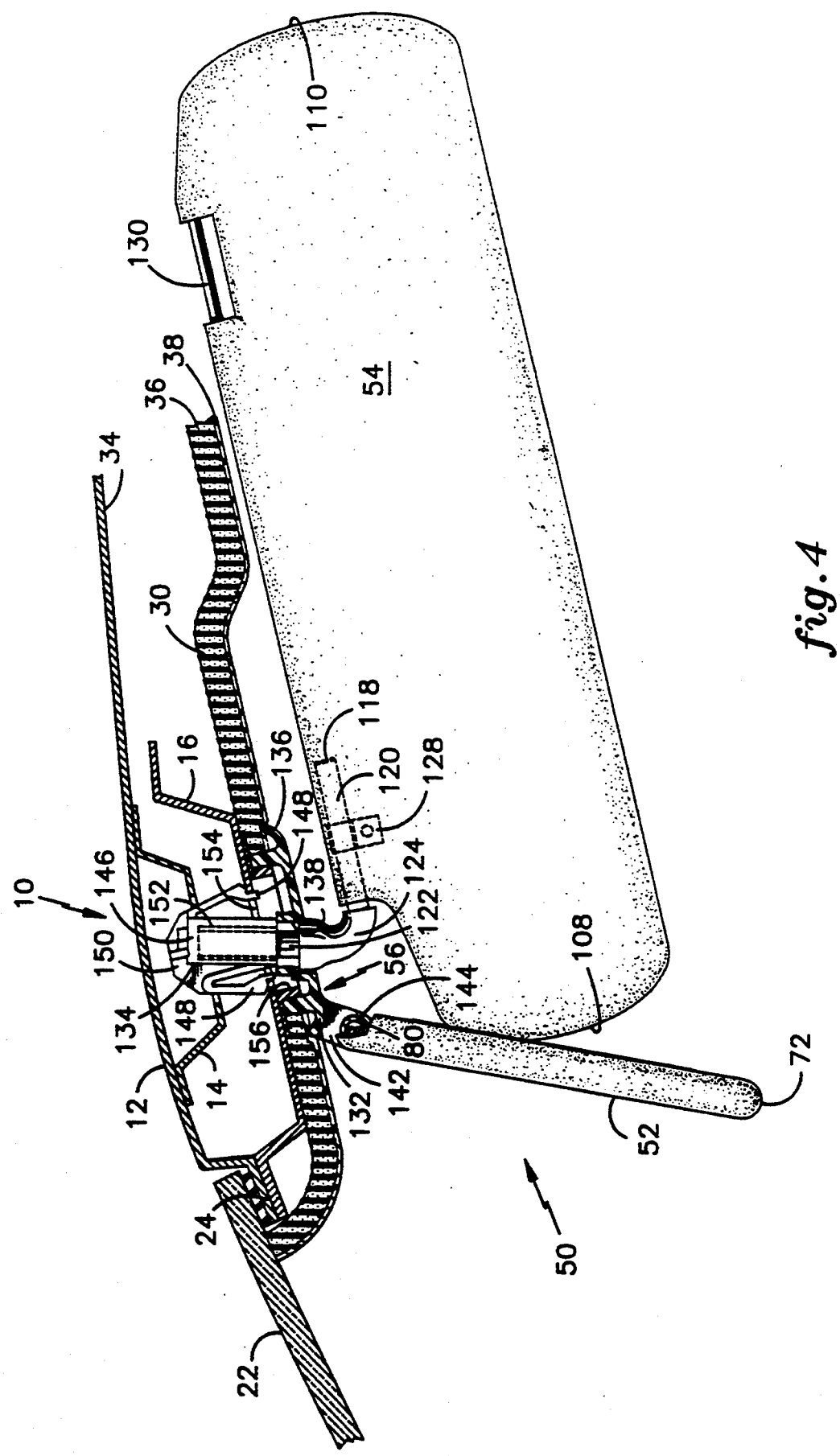
FIG. 4 is a sectional view, taken along line 4—4 of FIG. 2, showing the primary and secondary sun visors in their functional positions.

A P-shaped detent clip 94 (FIG. 2), a U-shaped detent clip (not shown) or a bifurcated detent clip (not shown) is internally mounted within primary sun visor 52 surrounding an adjacent portion of rod 80. This detent clip 94 is made from a durable spring steel material and is designed to operatively register with a flat transversely formed across rod 80. Accordingly, detent clip 94 provides a preloaded biasing force upon rod 80 thereby rotatably maintaining primary sun visor 52 in a stowed position, as is shown in FIG. 3. Furthermore, detent clip 94 provides frictional control against rod 80 when primary sun visor 52 is operatively rotated to a functional position proximate with windshield 22. This functional position is best shown in FIGS. 2 and 4. Exemplary U-shaped detent clips are known within the art and are disclosed in U.S. Pat. No. 4,828,313 entitled "Visor Control," which issued to Lanser et al. on May 9, 1989; and U.S. Pat. No. 4,500,131 entitled "Visor Control," which issued to Fleming on Feb. 19, 1985. A bifurcated detent clip is described in U.S. Pat. No. 4,390,202 entitled "Visor Control," which issued to Flowerday et al. on Jun. 28, 1983.

Referring to FIGS. 2 through 4, secondary sun visor 54 is defined by a pair of faces 100 and 102 which are bordered by a top peripheral edge 104, a bottom peripheral edge 106 and a pair of ends 108 and 110. A longitudinal dimension of secondary sun visor 54, taken between ends 108 and 110, is somewhat shorter than is a longitudinal dimension, measured between ends 74 and 76, of primary sun visor 52. Moreover, secondary sun visor 54 is constructed from a pair of injection molded shells 112 and 114 which are covered by a cloth material 116 in a fashion similar to that of primary sun visor 52.

Pivot rod 118 acts in combination with secondary sun visor 54 to allow secondary sun visor 54 to both rotate from a stowed position with face 102 against headliner panel 30, as is illustrated in FIG. 3, to a lowered position. Pivot rod 118 further provides a means for pivoting secondary sun visor 54 from a forward position proximate with windshield 22 to a functional side window position, as is shown in FIGS. 2 and 4. Pivot rod 118 has an L-shaped configuration defined by substantially horizontal arm 120 and a substantially vertical arm 122 which are joined together by an elbow portion 124. Substantially vertical arm 122 and elbow portion 124 are encapsulated with a polymeric material such as nylon or other suitable engineering grade plastic. Substantially horizontal arm 120 of pivot rod 118 is rotatably joined with secondary sun visor 54 near top peripheral edge 104 by a plurality of internal eyelets 126 and a detent clip 128. Secondary sun visor 54 further has a cylindrically-shaped pin 130.

FIG. 4 illustrates outboard fastening device 56 as being comprised of a bezel 132 and a quick connect attachment member such as a socket 134. Bezel 132 has a median portion 136 within which is a circular aperture 138, defined by an inner edge, extending vertically therethrough. Furthermore, a hollow collar 140 is concentrically aligned with aperture 138 and protrudes upward from median portion 136 of bezel 132. Also, a structural tab 142 projects downward from a forward portion of bezel 132. This tab 142 has a cylindrical bore 144 transversely formed therein being open toward the centerline of the vehicle. Socket 134 has a rectangular body 146 from which extends a pair of somewhat flexible legs 148 and an upper tapered guiding portion 150. A key-holed tunnel 152 extends in a substantially vertical manner within body 146 of socket 134. Substantially vertical arm 122 is interlockably and pivotably coupled within tunnel 152 of socket 134. Moreover, legs 148 are constructed so as to be easily inserted within a square opening 154 cut within A-pillar 16 for snap-fit interlocking engagement thereto. Additionally, bezel 132 is affixed to a flange 156 projecting outward from socket 134 by a pair of screws (not shown). Such a socket and bezel combination are disclosed in U.S. Pat. No. 4,913,484 entitled "Headliner and Sunshade Fastener," which issued to Dowd et al. on Apr. 3, 1990. Thus, sun visor system 50 and the adjacent portion of headliner panel 30 can be fastened to structural roof assembly 10 through this quick connect fastening means.

Center support fastener 58 is juxtapositioned proximate with inboard end 76 of primary sun visor 52 and is displaced near windshield 22. This is best illustrated in FIG. 2. Center support fastener 58 has an aesthetically pleasing body segment 170 and a pair of cantilevered barb-shaped snap legs 172. Furthermore, center support fastener 58 is constructed with a cavity 174 extending transversely therein aligned with its open portion facing bore 144 of bezel 132. Snap legs 172 are installed into a slot cut within front header 14 and then a mandrel 178 is inserted between snap legs 172 such that center support fastener 58 is engagably attached to structural roof assembly 10 through a quick connect fastening means. Also, center support fastener 58 has a somewhat flexible receptacle portion 180 rearwardly facing therefrom which is rotatably engagable around pin 130 of secondary sun visor 54 but can be easily disengaged therefrom when secondary sun visor 54 is pivoted.

Outboard distal end 86 of rod 80 is snugly mounted within bore 144 of outboard fastening device 56 by insertion of a set screw (not shown) or the like. Inboard distal end 88 of rod 80 is also snugly affixed within cavity 174 of center support fastener 58. In order to prevent undesirable rotation of rod 80, when detent clip 94 is located internally within primary sun visor 52, distal ends 86 and 88 should have a key-holed formation congruent with a similar shape contained in bore 144 and cavity 174. Therefore, primary sun visor 52 is prevented from pivoting away from its position proximate with windshield 22. However, primary sun visor 52 is operable to rotate from its stowed position to its functional position about rod 80.

Alternatively, rod 80 may be securely affixed to primary sun visor 52 such that both are rotatably journalled between outboard fastening device 56 and center support fastener 58. Thus, primary sun visor 52 and rod 80 would rotate coincidentally with one another and a detent clip would be stationarily mounted within either outboard fastening device 56 or center support fastener 58.

Figure 5:
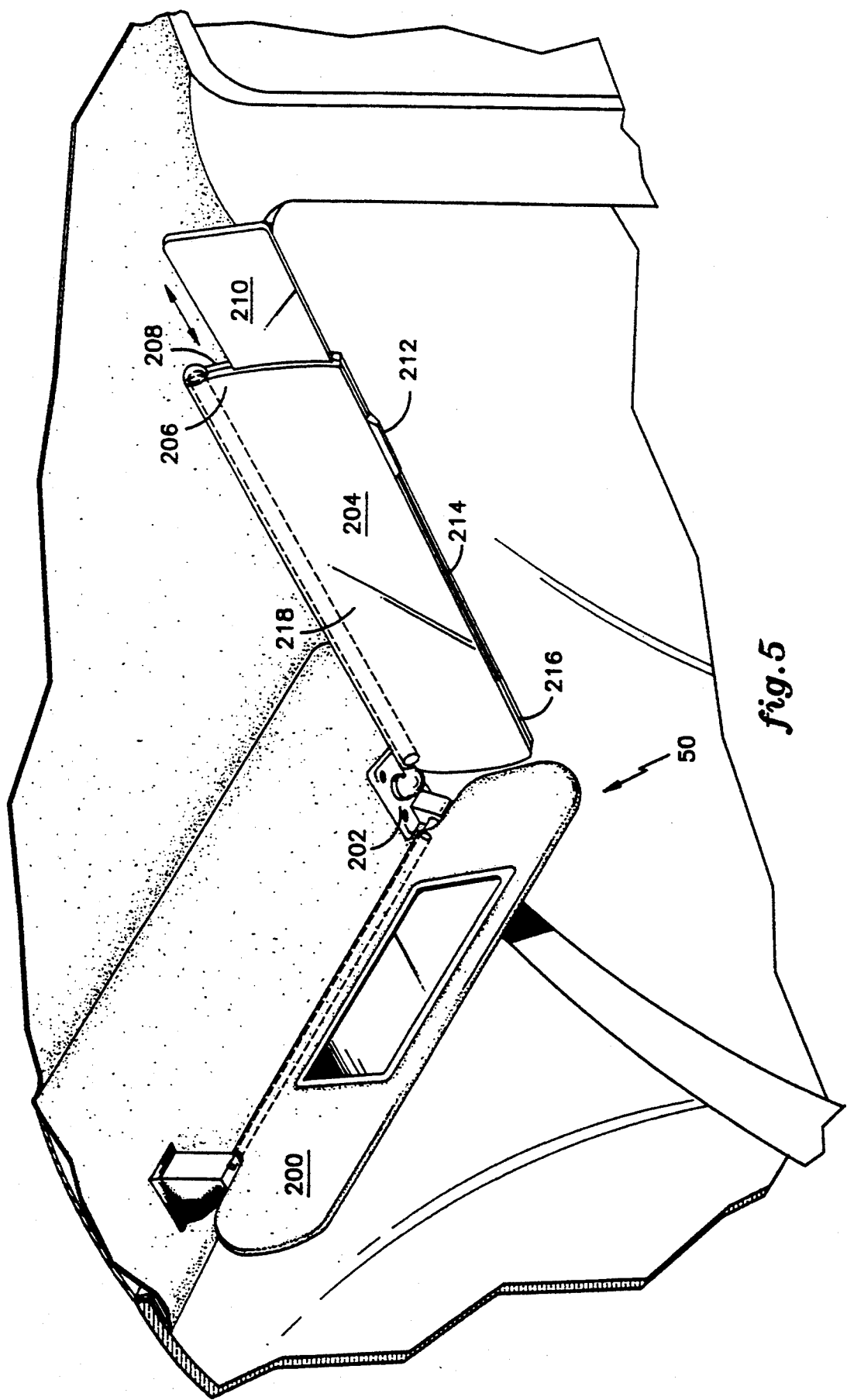
FIG. 5 is a rear perspective view of an alternate embodiment of the sun visor system of FIG. 1 showing the primary and secondary sun visors in their functional positions.

An alternate embodiment of the present invention sun visor system 50 is shown in FIG. 5. In this embodiment, a primary sun visor 200 and an outboard fastening device 202 are constructed similar to that of the preferred embodiment. However, a secondary sun visor 204 is comprised of a pair of shells 206 and 208 which encase an extension panel 210 therebetween. Extension panel 210 has a manually operable finger 212 extending from a longitudinal slot 214 created along a bottom edge 216 of secondary sun visor 204. Extension panel 210 is longitudinally slidable along a plane parallel with a plane defined by face 218 of secondary sun visor 204. Shells 206 and 208 are further provided with various ribs and grooved formations thereby providing a tracking means upon which extension panel 210 is operably engaged. Thus, a significant advantage of this embodiment is that extension panel 210 can; be retracted within a shortened length secondary sun visor 204. Accordingly, secondary sun visor 204 can be conveniently pivoted from its stowed position to its functional side window position without interfering with the vehicle occupant's head 230. Extension panel 210 is preferably made from a filled polymeric material which resists high temperature warping.

It will be appreciated that the present invention sun visor system has many advantages over the prior art systems. One such advantage is that a vanity mirror is always accessible to a vehicle occupant even when sunlight is blocked along the side window. Another advantage is that a shortened secondary sun visor is used for side window shading whereby the occupant is not required to move his head a great distance out of the way of the swinging sun visor. Third, the present invention is advantageous in that the heavier primary sun visor is suspended near both the inboard and outboard ends thereof thereby lessening the traditional costly durability standards required for the rod and outboard fastening device in order to prevent sagging. Additionally, the present invention sun visor system allows for more efficient and thinner packaging against the headliner panel thus creating increased headroom within the automotive vehicle. The sun visor system of the present invention is also ideally suited for use in combination with a modular headliner assembly. Such a modular headliner assembly is disclosed in U.S. Pat. No. 4,902,068 entitled "Modular Headliner Assembly", which issued to Dowd et al. on Feb. 20, 1990.

While various embodiments of this sun visor system have been disclosed, it will be appreciated that various modifications may be made without departing from the present invention. For example, a center support fastener and an outboard fastening device may be attached to a structural roof assembly by use of screws or the like. Furthermore, a center support fastener is not necessarily required for use in the present invention system. Moreover, while the sun visors have been disclosed as being injection molded from a polymeric material, one skilled in the art would also know that a urethane foam and wire frame construction, or a press board blade and stamped metal rotational coupling configuration could also be used. Also, the mechanism supplying a rotational axis for the primary sun visor may be independent from the outboard fastening device. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A sun visor system for use in an automotive vehicle having a structural roof assembly covered by a decorative headliner panel therebelow, said automotive vehicle further having a windshield and a side window, said sun visor system comprising:

an outboard fastening device attached to said structural roof assembly thereagainst, said outboard fastening device having a first rod coupled thereto but being restricted from pivoting toward said side window such that said first rod is always suspended in positional agreement with said windshield, said outboard fastening device also having a second rod pivotably coupled thereto, said second rod pivotable from a position substantially parallel with said first rod to a position substantially proximate with said side window;

a first sun visor having a pair of faces, an inboard end and an outboard end thereof, said first sun visor rotatably joined to said first rod;

a second sun visor having a pair of faces and a pair of ends thereof, said second sun visor rotatably joined to said second rod such that said second sun visor can be pivoted and rotated from a stowed position to a functional position, said stowed position of said second sun visor defined by a first of said pair of faces thereof being located against said lower surface of said headliner panel orientated with said second rod substantially parallel with said first rod, said functional position of said second sun visor defined by the first of said pair of faces thereof rotated substantially facing toward said side, window; and said first sun visor rotatable from a stowed position to a functional position, said stowed position of said first sun visor defined by a first of said pair of faces thereof located against a second of said pair of faces of said second sun visor when said second sun visor is in its stowed position, said functional position of said first sun visor defined by a second of said pair of faces thereof substantially facing toward said windshield.

2. The sun visor system of claim 1 further comprising: a center support fastener at least partially juxtapositioned adjacent to said bottom surface of said headliner panel thereabove and affixed to said structural roof assembly thereagainst, said center support having an inboard end of said first rod mounted thereto.

3. The sun visor system of claim 2 wherein: said outboard fastening device and said center support fastener have said first rod rotatably journalled therebetween.

4. The sun visor system of claim 3 further comprising: a cylindrical pin affixed to said second sun visor along a top peripheral edge thereof; and said center support fastener having a receptacle portion therein within which said cylindrical pin of said second sun visor can be rotatably attached when said second sun visor is in its stowed position.

5. The sun visor system of claim 2 wherein: said outboard fastening device and said center support fastener have said first rod securely affixed thereto whereby rotation of said first rod is restricted.

6. The sun visor system of claim 2 wherein: said center support fastener has a quick connect attachment formation thereupon for fastening to said structural roof assembly.

7. The sun visor system of claim 1 wherein: said second rod of said second sun visor has an L-shape thereto defined by a substantially vertical arm and a substantially horizontal arm thereof, said substantially horizontal arm has said second sun visor rotatably joined therearound.

8. The sun visor system of claim 7 wherein: said outboard fastening device has a quick connect attachment member thereupon for fastening to said structural roof assembly.

9. The sun visor system of claim 8 wherein said quick connect attachment member includes:

a socket defined by a housing having a substantially vertical tunnel extending therein and at least a pair of flexible legs projecting angularly therefrom, said pair of legs of said socket being in snap-fit interlocking engagement with an aperture formed in said structural roof assembly, said substantially vertical arm of said second rod protruding coaxially inside said tunnel of said socket and being pivotably engagable therewith.

10. The sun visor system of claim 1 further comprising:

an extension panel slidably affixed to said second sun visor, said extension panel further extendable and retractable from one of said pair of ends of said second sun visor substantially opposite from said outboard fastening device, said second sun visor having a shorter longitudinal dimension between said pair of ends thereof relative to said first sun visor when said extension panel is in its retracted position.

11. The sun visor system of claim 10 wherein: said extension panel is at least partially surrounded by said second sun visor thereabout such that said extension panel can be substantially hidden from view when in its retracted position.

12. The sun visor system of claim 1 wherein: said outboard fastening device is further defined by a bezel with an opening therein defined by an inner edge thereabout, said outboard fastening device also has a hollow collar projecting upward therefrom in registry with said opening, said outboard fastening device has a tab protruding therebelow with a bore extending transversely therethrough defined by an inside surface thereabout;

said hollow collar of said outboard fastening device is aligned with said tunnel of said socket thereabove such that said substantially vertical arm of said second rod coaxially extends therethrough; and an outboard end of said first rod is mounted within said bore of said tab.

13. The sun visor system of claim 1 further comprising:

a vanity mirror mounted upon said first sun visor for use by a vehicle occupant even when said second sun visor is in its pivoted functional position.

14. The sun visor system of claim 1 wherein:
said first and second sun visors and said outboard fastening device are preassembled to a modular headliner assembly.

15. The sun visor system of claim 1 wherein:
said second sun visor is cloth covered.

16. A sun visor system for use in an automotive vehicle having a structural roof assembly covered by a decorative headliner panel therebelow, said automotive vehicle further having a windshield and a side window, said sun visor system comprising:

a first sun visor having a pair of faces thereof bordered by an upper peripheral edge, a lower peripheral edge, an inboard and an outboard end thereabout, said upper peripheral edge of said first sun visor rotatably juxtapositioned adjacent to a lower surface of said headliner panel thereabove and orientated substantially proximate with said windshield, said first sun visor rotatable from a stowed position to a functional position but restricted from pivoting toward said side window;

a second sun visor having a pair of faces thereof bordered by a top peripheral edge, a bottom peripheral edge and a pair of ends thereabout, said second sun visor rotatably joined to a pivot rod such that said second sun visor can be pivoted and rotated from a stowed position to a functional position, said stowed position of said second sun visor defined by a first of said pair of faces thereof located against said lower surface of said headliner panel orientated with said rod substantially parallel with said top peripheral edge of said first sun visor, said functional position of said second sun visor defined by the first of said pair of faces thereof being pivoted and rotated substantially facing toward said side window; and the stowed position of said first sun visor defined by a first of said pair of faces thereof located against a second of said pair of faces of said second sun visor when second sun visor is in its stowed position, said functional position of said first sun visor defined by a second of said pair of faces thereof substantially facing toward said windshield.

17. The sun visor system of claim 16 further comprising:

a means for fastening attached to said structural roof assembly thereagainst, said fastening means further having an axle means for rotating therearound securely affixed thereto with said axle means restricted from pivoting toward said side window such that said axle means is suspended in positional agreement with said windshield, said first sun visor rotatably joined to said axle means.

18. The sun visor system of claim 17 wherein:
said fastening means has said rod of said second sun visor pivotally coupled thereto.

19. The sun visor system of claim 17 wherein:
said outboard fastening device has a quick connect attachment member thereupon for fastening to said structural roof assembly.

20. The sun visor system of claim 16, wherein:
said first and second sun visors and said fastening means are preassembled to a modular headliner assembly.

21. A sun visor system for use in an automotive vehicle having a structural roof assembly covered by a decorative headliner panel therebelow, said automotive vehicle further having a windshield and a side window, said sun visor system comprising:

an outboard fastening device attached to said structural roof assembly thereagainst, said outboard fastening device having a first rod coupled thereto but restricted from pivoting toward said side window such that said first rod is suspended in positional agreement with said windshield, said outboard fastening device also having a second rod pivotably coupled thereto, said second rod pivotable from a position substantially parallel with said first rod to a position substantially facing toward said side window;

a center support fastener at least partially juxtapositioned adjacent to said bottom surface of said headliner panel thereabove and affixed to said structural roof assembly thereagainst, said center support having an inboard distal end of said first rod mounted thereto;

a first sun visor having a pair of faces, an inboard end and an outboard end thereof, said first sun visor rotatably joined to said first rod;

a second sun visor having a pair of faces and a pair of ends thereof, said second sun visor rotatably joined to said second rod such that said second sun visor can be pivoted and rotated from a stowed position to a functional position, said stowed position of said second sun visor defined by a first of said pair of faces thereof being located against said lower surface of said headliner panel orientated with said second rod substantially parallel with said first rod, said functional position of said second sun visor defined by the first of said pair of faces thereof rotated substantially facing toward said side window;

said first sun visor rotatable from a stowed position to a functional position, said stowed position of said first sun visor defined by a first of said pair of faces thereof located against a second of said pair of faces of said second sun visor when said second sun visor is in its stowed position, said functional position of said first sun visor defined by a second of said pair of faces thereof substantially facing toward said windshield; and a vanity mirror mounted upon the first of said pair of faces of said first sun visor such that a vehicle occupant can use said vanity mirror when sunlight is blocked along said side window.

22. A sun visor system for use in an automotive vehicle having a structural roof assembly covered by a decorative headliner panel therebelow, said automotive vehicle further having a windshield and a side window, said sun visor system comprising:

a first sun visor having a pair of faces and a pair of ends thereof, said first sun visor restricted from rotating toward said side window; and a second sun visor having a pair of faces and a pair of ends thereof, each of said pair of faces of said second sun visor having a relatively smaller surface area than each of said pair of faces of said first sun visor, said second sun visor swingable toward said side window and stowable with one of said pair of faces thereof substantially juxtapositioned against said headliner panel.

23. The sun visor system of claim 22 wherein:

said first sun visor is relatively longer between said pair of ends thereof as compared to the length of said second sun visor.

24. The sun visor system of claim 23 wherein:
said first sun visor is pivotable from a stowed position with one of said pair of faces thereof juxtapositioned against a second of said pair of faces of said second sun visor to a functional position wherein a second of said pair of faces of said first sun visor corresponds with the orientation of said windshield.

25. The sun visor system of claim 22 further comprising:
a vanity mirror mounted upon said first sun visor for use by a vehicle occupant even when said second sun visor is in its rotated functional position.

* * * * *